Jan. 9, 1940.　　　　V. I. HOOPER ET AL　　　　2,186,924
METHOD OF HANDLING FLUIDS
Filed May 11, 1938　　　6 Sheets-Sheet 1

Inventors.
Virgil I. Hooper
Louis G. Hooper
by Parker & Carter
Attorneys.

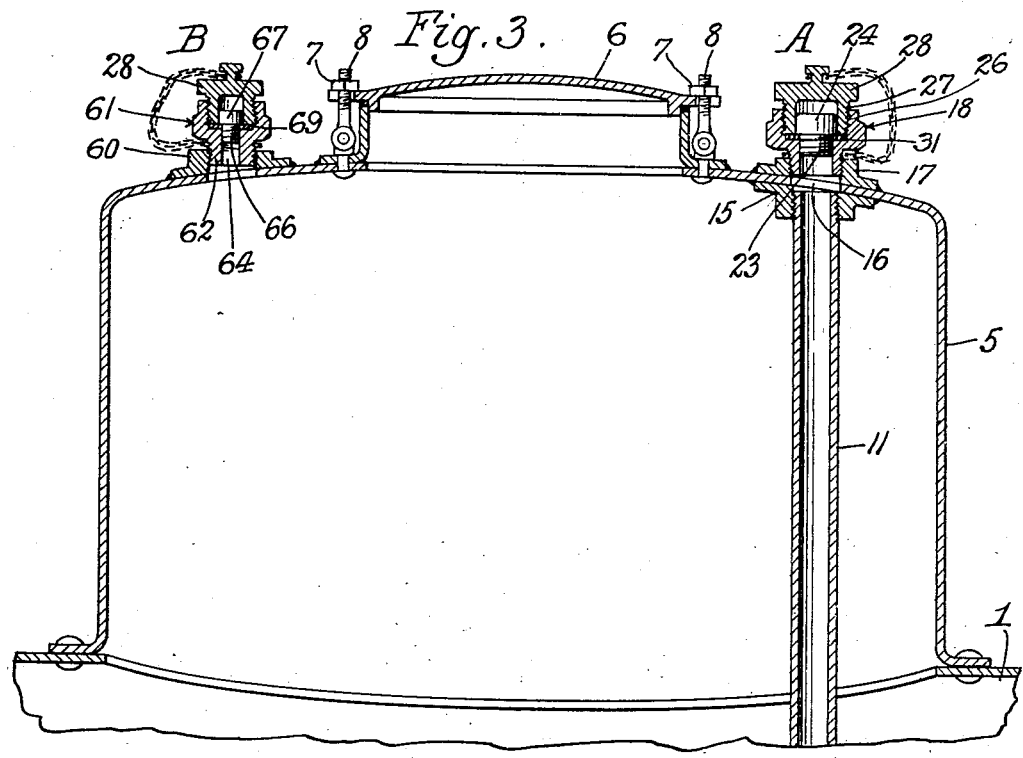
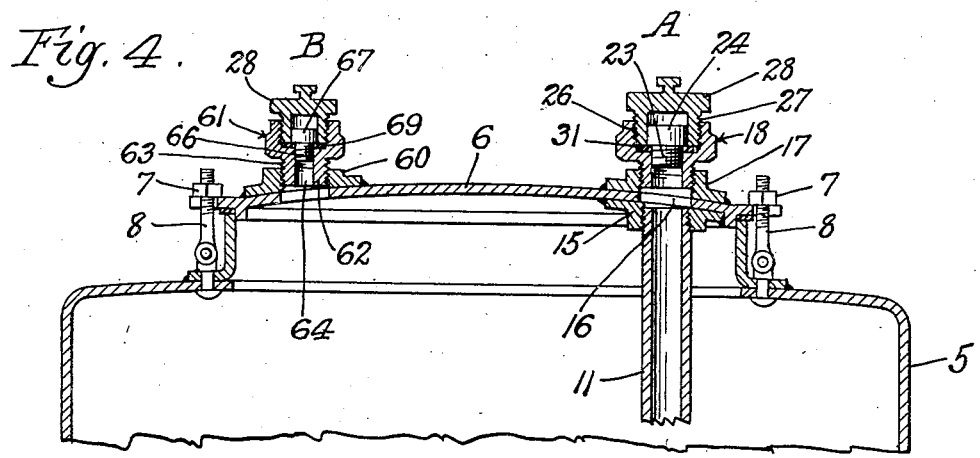

Jan. 9, 1940.   V. I. HOOPER ET AL   2,186,924
METHOD OF HANDLING FLUIDS
Filed May 11, 1938    6 Sheets-Sheet 3

Inventors.
Virgil I. Hooper
Louis G. Hooper
by Parker Carter
Attorneys.

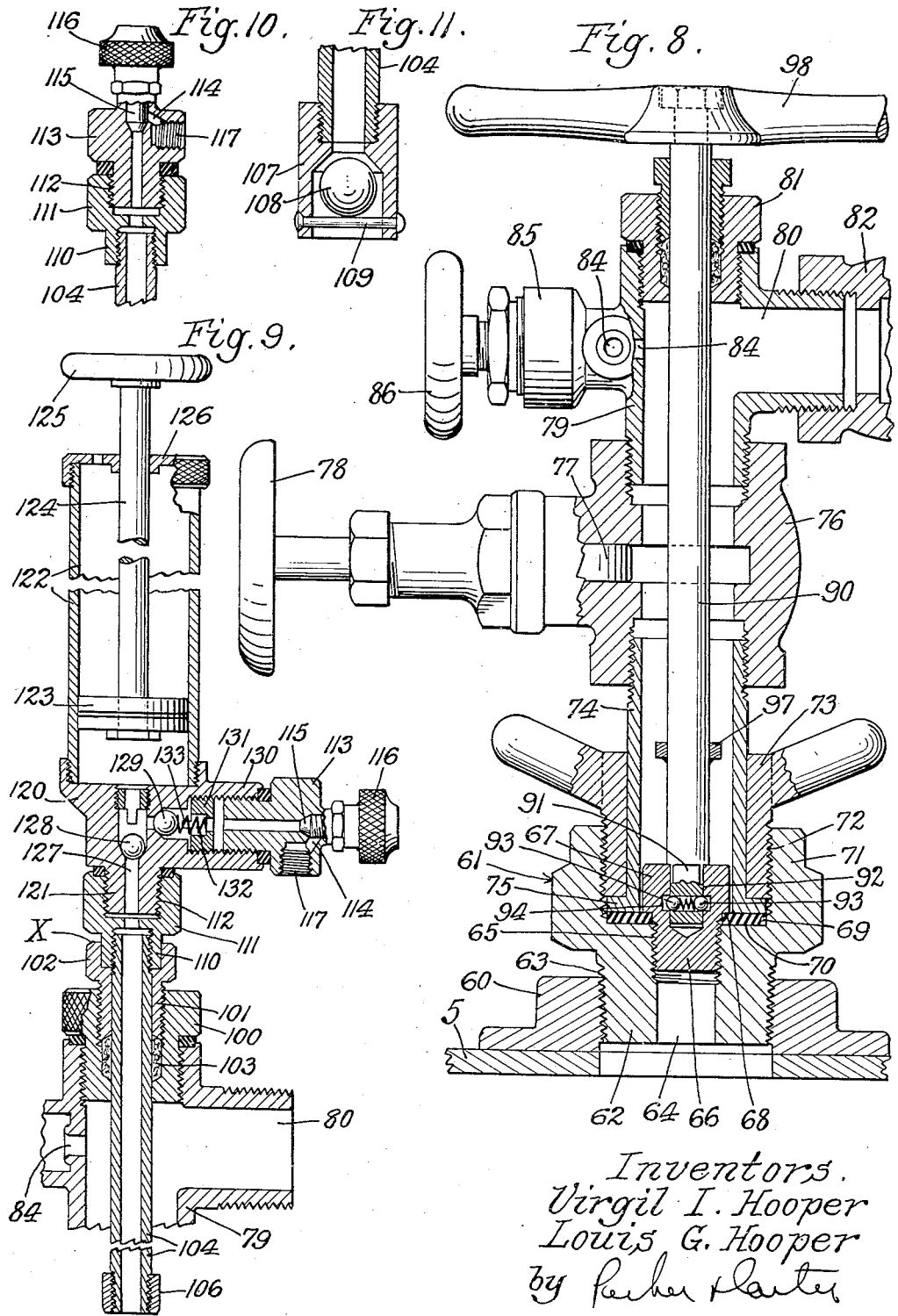

Jan. 9, 1940.  V. I. HOOPER ET AL  2,186,924
METHOD OF HANDLING FLUIDS
Filed May 11, 1938  6 Sheets-Sheet 5
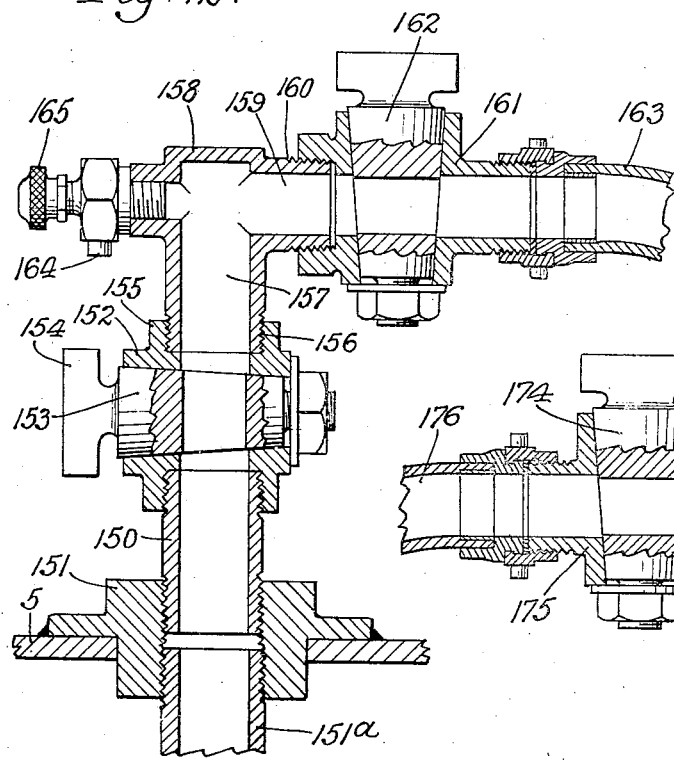
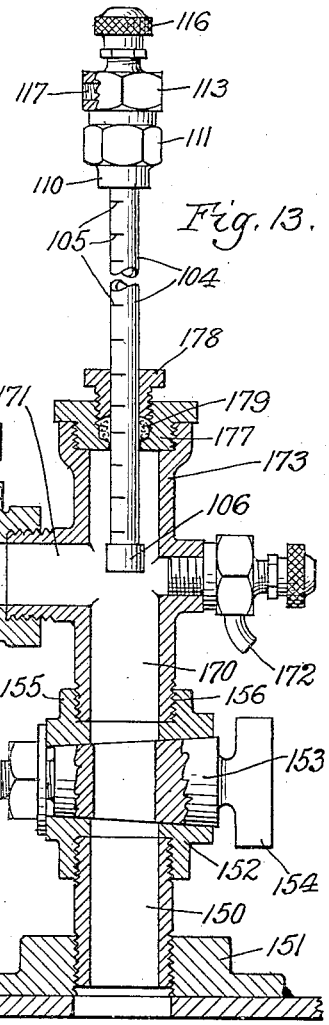
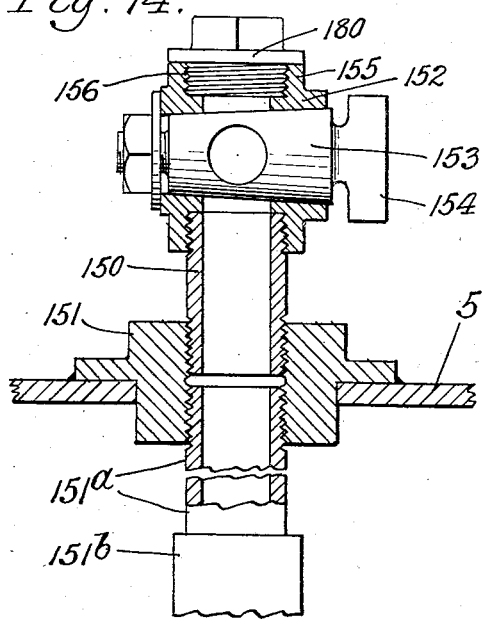
Inventors.
Virgil I. Hooper
Louis G. Hooper
by Parker & Carter
Attorneys.

Patented Jan. 9, 1940

2,186,924

UNITED STATES PATENT OFFICE 2,186,924

METHOD OF HANDLING FLUIDS

Virgil I. Hooper, Gordon, Tex., and Louis G. Hooper, Sarepta, La., assignors to The Bastian-Blessing Company, Chicago, Ill., a corporation of Illinois Application May 11, 1938, Serial No. 207,418

9 Claims. (Cl. 62—1)

Our invention relates to a method of handling liquids or gases or mixed liquids and gases. One purpose is the provision of an improved method for loading such materials into a tank or tank car.

Another purpose is the provision of an improved method for unloading such materials from a tank or tank car.

Another purpose is the provision of an improved method for gauging the contents of the tank or closed space.

Another purpose is the provision of an improved method for sampling the contents of a tank or closed space or stored body of liquid and the like.

Another purpose is the provision of an improved method for maintaining the interior of a tank or storage or shipping container for liquids, gases and the like closed to the atmosphere during the insertion or removal of the fittings necessary to feed fluids to or remove them from a tank or closed space.

Another purpose is the provision of an improved method for maintaining the interior of a tank or storage or shipping space for liquids, gases and the like closed to the atmosphere during the gauging or sampling of the contents.

Another purpose is the provision of an improved method of gauging or sampling the contents of a tank or closed space which is independent of the existence of a head of pressure within such tank or space.

Another purpose is the provision of an improved method of handling liquids, gases or mixed liquids and gases for shipment or storage whereby the release of any substantial part of such materials to the atmosphere is prevented during either loading or unloading or both.

Another purpose is the provision of an improved method of controlling gas pressures during loading and unloading of such materials.

Other purposes will appear from time to time in the course of the specification and claims.

We illustrate our invention more or less diagrammatically in the accompanying drawings wherein:

Figure 3 is a vertical longitudinal section through the dome of a tank car illustrating fittings and closures in place and in closed position;

Figure 4 is a similar view illustrating certain fittings and closures applied directly to the dome cover plate of a tank car;

Figure 8 is a vertical section through the fittings applied to the vent of a tank with the closure removing means associated with the vent assembly;

Figure 9 illustrates the upper portion af the vent assembly with the closure removing means removed and with the gauging assembly substituted;

Figure 10 illustrates the gauging assembly with the gauging pump omitted;

Figure 11 is a detail;

Figure 12 is a vertical section through a variation loading assembly;

Figure 13 is a vertical section through a variant venting assembly;

Figure 14 is a detail; and

Like parts are indicated by like symbols throughout the specification and drawings.

Figure 1:
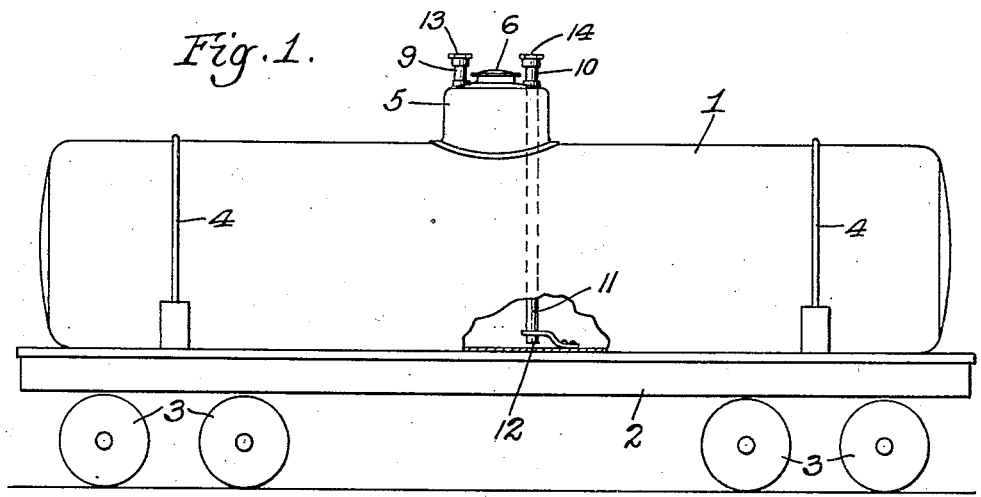
Figure 1 is a side elevation of a tank car with parts broken away, illustrating a typical tank car prior to its equipment with the mechanisms with which our method is carried out.

Referring to the drawings and first to Figure 1, 1 indicates any suitable tank herein shown as forming part of a tank car structure including a car platform 2, wheels 3 and any suitable means 4 for holding the tank on the car. 5 is a tank car dome having a removable cover plate 6 normally held in position by any suitable nuts and bolts 7, 8. It may be understood that any other suitable securing means may be applied. 9 is a vent nipple and 10 is an inlet nipple in communication with the eduction pipe 11 which terminates closely adjacent the bottom of the tank 1 as at 12. Any suitable caps or closures 13, 14 are indicated.

While we are illustrating our invention as applied in connection with a tank car, which is a practical application threof, it will be understood that it applies equally well to other storage or shipping spaces such as tanks on steamers, fixed storage systems, underground gas storage and dispensing systems and the like. However, we find it convenient to illustrate our invention in connection with tank cars and its application to tank cars will be understood to be a matter of illustration and not limitation.

Figure 2:
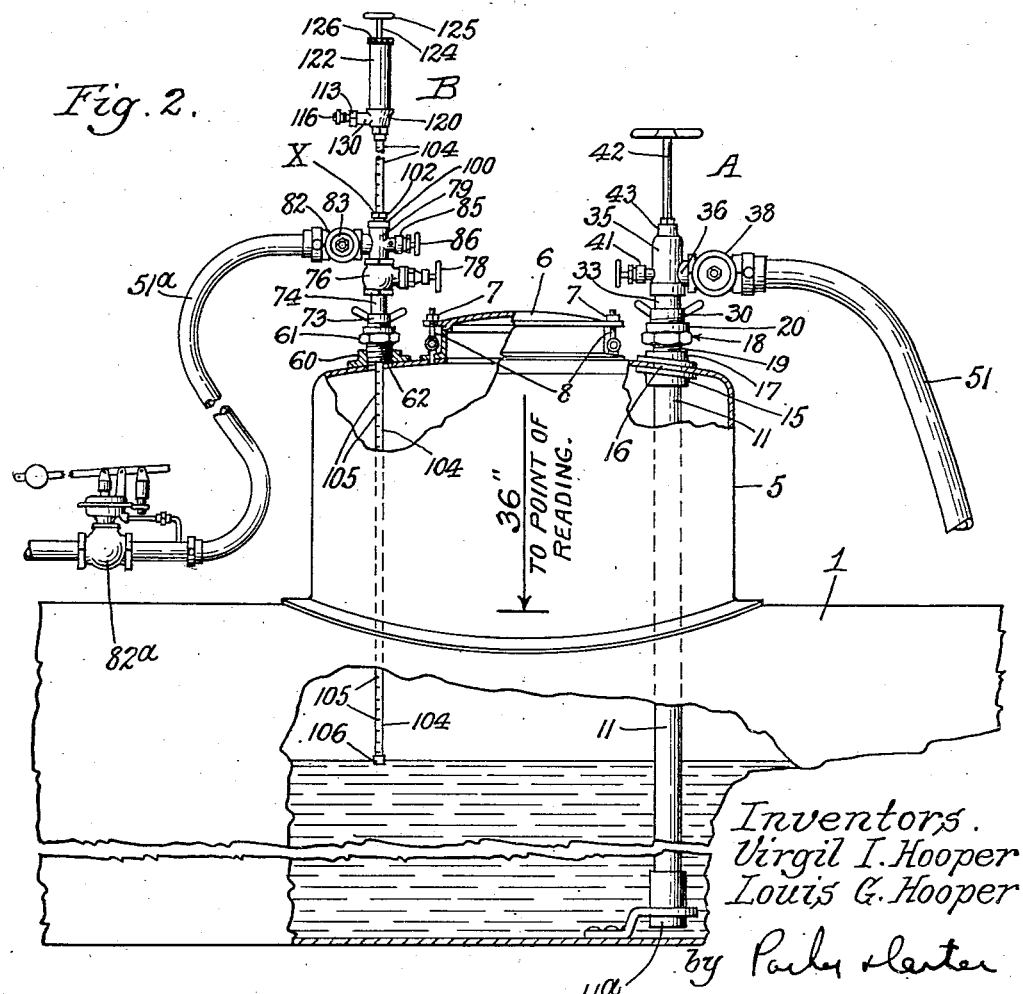
Figure 2 is a partial side elevation on an enlarged scale with parts broken away, illustrating the application to a tank car of the mechanisms with which our method can be carried out.

Referring to Figure 2, we illustrate a loading and unloading assembly generally indicated as A, and a gauging and vent assembly generally indicated as B. We will first describe the loading assembly. In this connection, the assembly A in Figure 2 should be considered in connection with the more detailed showing in Figures 5, 6 and 7, and with the parts in closed position as shown at A in Figures 3 and 4.

Referring first to Figure 3, the education pipe 11, which will be understood to terminate closely adjacent the bottom of the tank 1, is shown as screw-threaded or otherwise secured to the flange 15 which is secured to the inner surface of the top of the dome. It may be welded, bolted or otherwise secured. It is in line, however, with the loading aperture 16 formed in the dome 5. Alined above the aperture 16 we illustrate a flange member 17 in which is positioned the fitting generally indicated as 18 and which is shown on a larger scale at the bottom of Figure 5. It may include, for example, a lower portion 19 of minimum diameter and an upper and preferably concentric portion 20 of greater diameter. In the particular embodiment shown in Figure 5 we illustrate the portion 19 as outwardly screw-threaded as at 21 and in screw-threaded relation with corresponding threads formed in the passage aperture of the flange 17. The inner face of the member 19 is shown as screw-threaded as at 22 to receive corresponding threads of a closure plug 23 having an upper enlargement or head 24 with a downward shoulder 25. The portion 20 is inwardly screw-threaded as at 26 and is formed selectively to receive the threads 27 of any suitable closure cap 28, as shown in Figures 3 and 4, when the assembly is removed and the closure substituted. Also, the same screw-threading is adapted to receive the threads 29 of the wing nut 30 which forms a part of the loading assembly below described. Thus the fitting receives selectively either the closure cap 28 or the loading assembly elsewhere herein described.

Assume that the tank is being shipped, either full or empty, it is preferably shipped with the closure 28 in place as shown in Figures 3 or 4, and with the closure plug 23 firmly screwed down against the gasket 31. The parts are preferably so proportioned that when the cap 28 is screwed into position its lower edge also abuts against the gasket 31 so that there is a double sealing effect against the single gasket 31 which in turn rests upon the single annular supporting or sealing surface 32 which is preferably but not necessarily perpendicular to the axis of the assembly. The gasket is not necessary but is advantageous and a tapered thread or ground joint or any other suitable sealing means might be employed.

It will further be understood that whereas we have illustrated the fitting 18 as a separate screw-threaded member in the flange 17, it may if desired be made unitarily with the top wall of the tank or dome or with the cover plate 6. Thus when we describe the application of the loading or venting assembly to an inlet or outlet fitting, it is understood that we wish to include the application of the assembly directly to an integrally formed portion of a tank, dome or cover plate.

Figure 5:
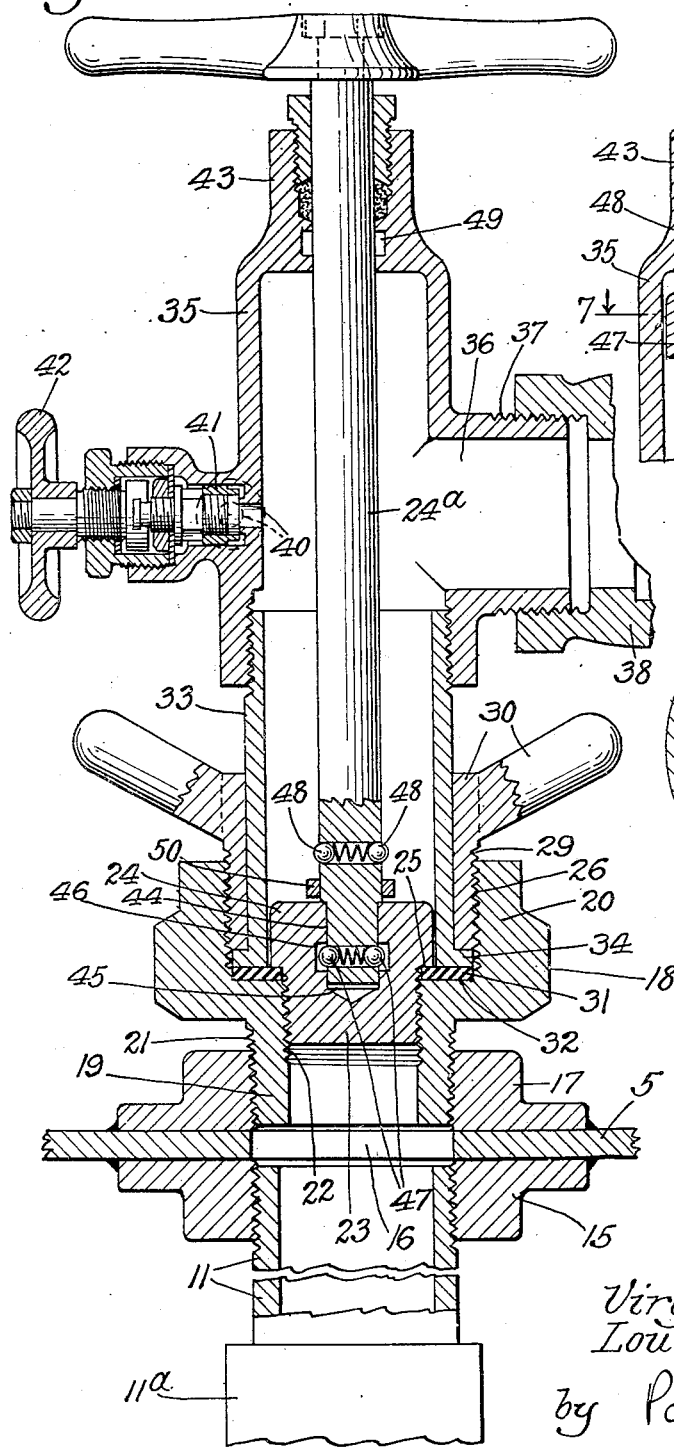
Figure 5 is a vertical section illustrating part of the loading assembly applied to the loading inlet.

Assume that the outer closure 28 has been removed, as in the case of Figure 5, a passage member 33 may be applied to the fitting. It is shown as having a bottom flange or shoulder 34 against which the wing nut 30 abuts and which preferably conforms to the surface 32 or to the gasket 31 whereby when the wing nut 30 is tightened, the member 33 is locked effectively in relation to the fitting 18 and surrounds the plug 23, 24. We illustrate the member 33 as having applied thereto an upper portion or extension 35 which may have a side passage or lateral extension or other inlet or outlet portion 36. We illustrate it as screw-threaded as at 37 to receive any suitable valve assembly 38 which is shown in Figure 2 and is broken away in Figure 5. It is important, however, that some closure means be provided so that the space within the members 33, 35, which constitutes a passage, may be closed to the atmosphere and also may be cut off from the loading or unloading zone. The diameter of the enlargement 24 of the clossure plug 23 is slightly less than the interior diameter of the members 33, 35.

We illustrate venting means adaptable to provide an atmospheric or outside communication with the space between the closure 23 and the valve 38 within the members 33 and 35. We illustrate for example an outlet passage 40 of restricted diameter which may be controlled by any suitable valve mechanism generally indicated as at 41 and controlled by an exterior handle or hand wheel 42. It will be understood, however, that any suitable means may be employed whereby the operator can permit the escape of gases from the space within the members 33, 35. This is of importance in connection with the application of the loading assembly. It is also important as permitting the user to determine whether or not the plug 23 is tightly in position at a time when the members 33 and 35 are still locked in the position in which they are shown in Figure 5. It is also possible to employ it to drain liquid from the said space and in general to relieve pressure from that space when necessary.

It will be understood that whereas we have shown a screw-threaded closure plug 23, other closure means might be employed. However, the screw-threaded plug is convenient and efficient. When such a plug is employed, it is necessary to unscrew it while the assembly 33, 35 is in place and to remove it out of the line of flow between the tank and the passage 36. We therefore provide a control stem 24a which is rotatably and slidably mounted in the end member or end block 43 of the member 35. Its lower end may be squared or otherwise formed as at 44 in order to penetrate and mate with the correspondingly formed aperture 45 of the plug 23, 24, whereby when the stem is rotated it serves to rotate the plug. The aperture 45 of the plug is provided with a recess 46 which receives the spring loaded or spring thrust balls 47 shown at the bottom of the stem 24a as examples of means for permitting an upward movement of the stem 24a to withdraw upwardly against gravity the plug 23.

Figure 6:
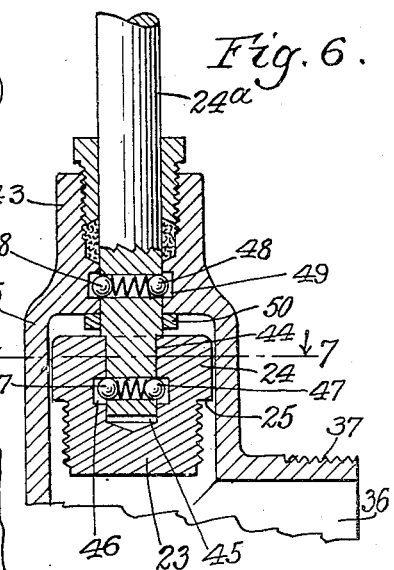
Figure 6 is a partial section illustrating some of the parts shown in Figure 5 in a different position.
Figure 7:
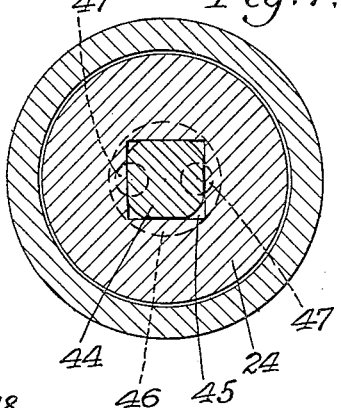
Figure 7 is a section on the line 7—7 of Figure 6.

Similar balls 48 are located in a somewhat higher portion of the stem 24a and are adapted, as shown in Figure 6, to penetrate the locking channel 49 in the member 43 whereby the operator has merely to withdraw the stem 24a to topmost position as limited by the abutment member 50 in order to lock it and the plug 23 in an upward position above and out of line with the passage 36.

What we thereby provide is means for putting the interior of the passage formed by the members 33, 35 and 36 into communication with the interior of the tank while maintaining such space closed and preventing any escape of gases from the interior of the tank. It will be understood that we may obtain the same result through different means but the screw-threaded plug is illustrated as a practical and operative solution of the problem. We could for example employ an externally controllable gate valve or any other suitable means, effective after the loading assembly has been locked in position, to put the interior of the loading assembly into communication with the interior of the tank without permitting any undesired escape of the contents of the tank and in particular without permitting any venting to the atmosphere.

Assume that the closure 28 has been removed, the loading assembly, including the parts 33 and 36, has been applied, and the interior of the loading assembly has thereafter been put in communication with the interior of the tank, the operator can then connect the valve 38 with any suitable source of liquid or gas to be loaded or transported, for example by means of the pipe 51. The valve 38 is then opened and pressure is applied, gravital or otherwise, the liquid or gas being flowed inwardly along the hose 51 through the open valve 38 inwardly along the passage 36, downwardly through the member 33, and thus into the tank which can then be filled to any predetermined level or pressure. Thereafter the valve 38 can be closed and the plug 23 thrust down into locking position and rotated until firmly locked. The valve 41 can be employed to determine whether or not it is fully locked and also to exhaust pressure from the space above the closure. Thereafter, the wing nut 30 can be rotated to unlocking position, the loading assembly can be entirely removed, and the shipping closure or cap 28 can be put back into place.

The above method has been described without the employment of the vent mechanism elsewhere herein shown and described and it will be understood that under some circumstances venting is not required and the vent mechanism can either be omitted or if present need not be used. With some substances, however, venting is necessary, for example in connection with the shipment of gasoline of certain specifications in tank cars.

Referring to the vent side, and considering for example Figures 3 and 4, 60 indicates a flange or passage member which may be secured to or may be formed integrally with the dome 5, or if desired the dome closure plate 6. We illustrate as secured to the member 60 a fitting generally indicated as 61 and shown in some detail in Figure 8 and roughly resembling the fitting 18 of Figure 5 but somewhat different in proportion and dimension. We illustrate it as having a lower portion 62 screw-threaded as at 63 to thread with threads formed in the inner face of the member 60. The passage 64 is also inwardly screw-threaded as at 65 to receive the screw-threaded portion of a plug 66 having an enlarged upper portion 67 and a shoulder 68 shown in sealing relationship with the gasket 69 on the sealing surface 70. The member 61 also has an upper portion 71 of greater diameter which is inwardly screw-threaded as at 72 in order to receive the exterior screw threads of a wing nut 73 herein shown as employed to lock in position the passage member 74 with its bottom flange 75 against which the lower edge of the wing nut abuts. The upper portion of the passage member 74 is shown as supporting or in communication with a valve housing 76 having therein the gate valve member 77 controlled by an exterior handle 78. Any suitable valve means may be employed, including even a stop cock, but we illustrate the gate valve as a practical solution of our problem which is to provide means for substantially sealing the space below the valve from the space above the valve and thus preventing at certain times any communication between the interior of the tank and the space above the valve 77.

We illustrate in Figure 8 a passage member or elbow 79 having a lateral passage 80 and a removable top closure or plug or block 81. 82 indicates a valve closing the passage 80 having an exterior handle 83 for its actuation. The space below the valve 82 may further be vented through the passage 84 controlled by any suitable valve structure generally indicated as 85 and having an exterior control handle 86. Preferably the passage outlet 84 is of relatively restricted diameter. It will be understood that the particular structure of valves and passages herein shown is merely illustrative and in a broad sense diagrammatic but what we wish to provide is a chamber or space which may be employed to surround the closure member 66 or its equivalent and which can be isolated from the atmosphere and closed in such fashion that when the closure 66 is moved out of closing position there will be no escape of gas and no substantial reduction of pressure in or from the tank.

In the particular form of mechanism shown in Figure 8 we provide a screw-threaded plug 66 and means for unscrewing it while the vent assembly above described is in position and is isolated from the atmosphere and from the rest of the system. We illustrate for example a stem 90 slidable and rotatable in the block or member 81 and having a reduced squared end 91 which penetrates the corresponding aperture 92 in the plug 66. In order to permit upward removal of the plug 66, we provide also the spring-loaded balls 93 which penetrate a recess 94 within the plug 66 whereby when the stem 90 is withdrawn in to upward position after the plug is unscrewed, the plug will also be withdrawn upwardly. The abutment 97 limits the upward movement of the stem in relation to the block 81 but permits it to be drawn sufficiently upwardly to permit the bottom of the plug 66 to clear the valve 77 whereby after the plug is released and upwardly withdrawn the operator can actuate the handle 78 and close the gate valve and thus close the interior of the tank.

Assume that the operator has released the plug 66 and has withdrawn it into upward position and has closed the valve 77. He can then remove the block 81, for example by unscrewing it, and can then upwardly remove the stem 90 with its handle 98 and the attached plug 66. This permits the insertion of the gauging and sampling assembly shown in Figures 9 and 10. The operator for example may screw the block or plug 100 into the place previously occupied by the block or plug 81. Upwardly extending from the plug 100 is the fitting 101 having an upward flange 102 which may serve as a gauge reading point. The member 101 may also serve to exert compression against the packing gland 103. Longitudinally slidable in this block structure is the gauge tube generally indicated as 104 which may have any suitable calibrations 105 on the exterior thereof. It may be in inches, fractions thereof, or any other suitable units of length. Any suitable enlargement 106 may be positioned on the bottom of the tube 104 to limit its upward withdrawal through the plug 100. If desired, the member 106 may be removed and any suitable excess flow valve, as shown for example in Figure 11, may be inserted in its place. Such a valve may include a valve housing 107, a ball 108, and a pin 109 which prevents the downward escape of the ball. It will be understood that when excess gas pressure flows, it will be effective to lock the ball 108 against the bottom of the passage 104 or against the upper end or taper of the aperture in the member 107.

Secured and for example screw-threaded to the top of the gauge tube 104 is a fitting 110 having an upper enlargement 111 interiorly screw-threaded as at 112. In Figure 10 we illustrate as screw-threaded into it a vent plug assembly 113 which includes an outlet passage or vent 114 and a valve 115 to control it, which may be in the form of a needle valve and is shown as having an exterior control handle 116. The vent 114 extends into the interiorly screw-threaded aperture 117. If desired, gas or liquid may be allowed to flow out through this aperture or it may be gathered in any suitable sampling bottle or bomb, which need not herein be shown.

The above assembly is satisfactory for use in systems or in handling materials where pressure exists or is maintained in the tank. Where pressure is not maintained or does not exist within the tank, for example where gauging liquids which do not cause or are not accompanied by gas pressures, we may apply a pump assembly to the gauging and sampling tube 104. In that case, the assembly 113 is removed and a pump body 120 is applied. It is shown as including a screw-threaded portion 121 in screw-threaded relationship with the threads 112 of the member 111. 122 indicates any suitable pump cylinder in which is contained a pump piston 123 which may be reciprocated as by the stem 124, controlled by the exterior handle 125 passing through the cylinder end 126. When the piston 123 is upwardly withdrawn, liquid passes upwardly through the passage 127 and about the valve 128. On the down stroke, the ball valve 128 is locked in closing position by pressure and the fluid is driven by the compression of the pump against and around the spring-loaded ball valve 129. 130 is an inwardly screw-threaded sleeve in the inner end of which we show a loading disc 131 which holds the spring 132 against the ball 129. The projection or abutment 133 limits the outward escape of the ball against the spring in response to the thrust of the pump. Then if desired the assembly 113 shown in Figure 10 and earlier described is screw-threaded into the member 130 as shown in Figure 9.

It will be realized that whereas we have described and shown a practical and operative means for carrying out our method, nevertheless many changes may be made in size, shape, number and disposition of parts and in the arrangement and use of the various parts without departing from the spirit of our invention. We wish our description and drawings to be taken as in a broad sense illustrative and diagrammatic rather than as limiting us to our specific showing. It will be understood in particular that our method may be carried out by a variety of mechanisms and the particular mechanisms herein shown, while adapted for our methods, are not of themselves necessary for its practice.

We have for example illustrated in Figures 12 to 14 an alternative structure which may be employed to carry out our method and which includes a vent and gauging assembly shown in Figure 13 and a loading assembly shown in Figure 12, which vary substantially from those shown in the earlier figures.

Referring first to Figure 12, a nipple 150 extends upwardly from the tank. It may for example be screw-threaded into a flange 151. 151a is any suitable eduction pipe, which extends to the bottom of the tank. 152 is any suitable valve housing having a valve 153 therein shown as controlled by the exterior handle 154. Whereas we have illustrated a turn cock, it will be understood that any other suitable type of valve may be employed at this point. The valve housing has an upper channel surrounded by a flange 155 inwardly screw-threaded as at 156 to receive a passage member 157. The passage member is shown as having a closed top or end 158 and a side passage member 159. Said side passage member is shown as screw-threaded as at 160 to receive a valve housing 161 having an exteriorly operable valve 162. This valve is also shown as a stop cock but any suitable valve such as a gate valve can be substituted therefor.

In communication with the passage 159 through the valve housing 161 is any suitable loading and unloading hose 163 which may extend to a source of liquid or fluid supply or, when the assembly is being used for unloading, may lead to any suitable delivery or storage zone. The interior of the passage member 157 between the valves 153 and 162 is provided with an additional outlet or vent 164 controlled by any suitable valve having for example an external handle 165. It will be understood that the vent 164 is of substantially smaller cross sectional area than the areas of the passages controlled by the valves 153 or 162. It may be further understood that it may be employed, if desired, to vent the interior of the passage member 157 to the atmosphere or otherwise.

Referring to Figure 13, in place of the passage member 157 I employ a passage member 170 having a side passage 171, a vent passage 172, and an upward extension 173 herein shown as extending above said side passage member and vent. The side passage member 171 may be controlled by any suitable valve 174 in the housing 175 whereby the interior of the passage member 170 may be put in communication with any suitable hose or conduit 176. Mounted in the upper end of the member 173 is a packing gland comprising a screw-threaded nut or block 177 in which is screw-threaded the member 178 which surrounds the packing 179. Through it may pass the gauge tube 104 which may be identical with the gauge tube shown in the previous figures and its associated parts will, therefore, not be further described.

Referring to Figure 14, it will be understood that the nipples 150 when the passage members 157 and 170 are removed, may be closed by having the valves 153 turned to the closed position. An additional closure may be employed in the shape of the screw-threaded plug 180 which is received in the threads 156 of the valve housing 155. Thus the form of Figures 12, 13 and 14 differs from the forms of valve assemblies above described in that the valves 153 and the actuating means therefor are mounted on the tank, and need not be removed.

Figure 15:
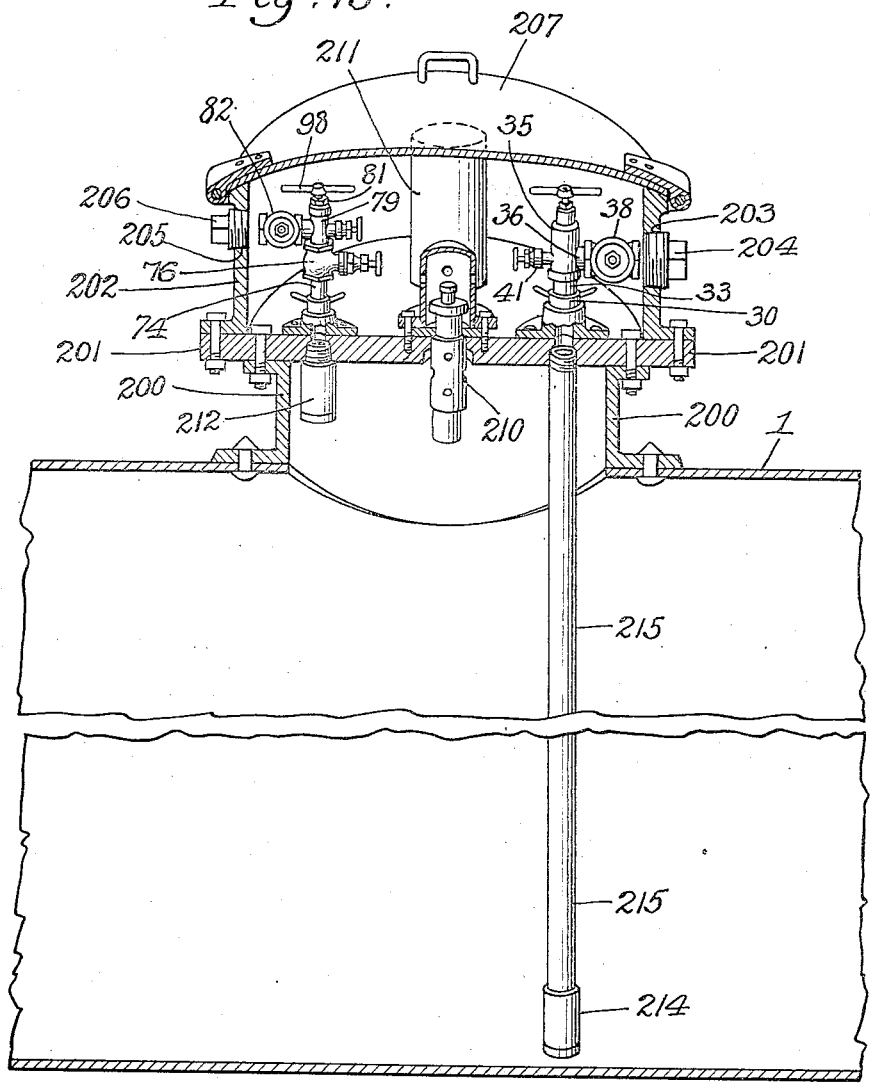
Figure 15 illustrates the application of our invention to a variant type of tank car.

Referring to Figure 15, we illustrate the application of our invention to a tank or tank car of the type employed for transporting propane and butane, and other liquids having similar characteristics. In this form of mechanism, a dome structure 200 is employed, having a massive dome plate 201. Bolted or otherwise secured to it is an upper housing structure 202 having a filling aperture 203, which is shown as closed by a screw-threaded plug 204, although any other suitable closure member may be employed. A vapor return aperture 205 is shown, which in turn is closed by a screw-threaded plug 206. 207 is any suitable removable cover, the details of which do not of themselves form part of the present invention.

It will be understood that any suitable filling hose may be inserted in the aperture 203 and any suitable vapor return line through the aperture 205 may be secured to the valve fittings therein shown. Since the fittings are substantially the same as those elsewhere described herein, it will not be necessary to describe them again. 210 indicates any suitable safety valve structure, the details of which do not of themselves form part of the present invention.

211 diagrammatically illustrates any suitable gauging and sampling structure which may for example include a slip tube gauge. In the form of Figure 15, however, the gauging and sampling means are actually fixed to or normally carried with the car or tank itself, and are not inserted through our valve fittings. 212 indicates diagrammatically an excess flow valve associated with the venting or vapor return valve assembly, and 214 diagrammatically illustrates a flow valve on the eduction pipe 215 of the loading side. Thus in the event of breakage or unintended removal or improper manipulation of the valves of the two units, the undesired escape of liquids or gases from the tanks will be prevented.

It will be realized that where in the specification and claims we use the term "passage fitting" or "passage fitting associated with the tank", we wish these terms to be interpreted with sufficient breadth to include the formation of a passage integral with the tank or integral with the dome cover or cover plate, it being a matter of choice as to whether or not such a fitting or its equivalent be made removable or be separately formed and thereafter applied permanently to the tank, or if it be formed as part of the tank, dome or cover.

Where in the specification and claims we describe the plug or closure as screw-threaded, it will be understood that we wish such term to be interpreted with sufficient breadth to cover any locking arrangement whereby the plug or closure is locked or unlocked in response to rotation thereof.

The use and operation of our invention are as follows:

A prime purpose of our method is to avoid the enormous losses which take place as in the current handling of gasolines, for example casinghead gasolines, which are prevailingly shipped in insulated containers. In handling highly volatile liquids, it is exceedingly disadvantageous and wasteful to permit such liquids or the gases therein or associated therewith to exhaust to the atmosphere, whether during loading or unloading or gauging or sampling. Our method enables an operator to load volatile liquids into a tank, to gauge them and sample them during loading, to unload such liquids, and to gauge and sample them during unloading without at any time permitting the storage or shipping zone of such liquids to be in direct communication with or to exhaust to the atmosphere.

Our method is applicable not merely to shipping such volatile liquids from point to point, but is also applicable to fixed or moving storage systems, for example buried tanks from which liquids or gases are thereafter dispensed or used. It may for example be used in connection with buried butane or propane systems used for house heating, cooking and the like.

A practical advantage of our method is that it can be applied to and used in connection with existing equipment, such as tank cars, without any substantial modification of the present structures and without the necessity of applying new and expensive equipment to tanks, tank cars and the like.

A further advantage is that our method can be carried out by the employment of removable equipment or units which are kept at the loading and unloading points or which may be carried to or removed from fixed tanks whereby a given assembly or group of assemblies may be employed in connection with a large number of different cars, tanks or the like. For example, in using our method in connection with tank cars or the like we can readily adapt such cars for our method by applying to them the preferably removable and semi-fixed fittings or portions shown for example in Figures 3 and 4, and including the fittings generally indicated as 18 in Figure 5 and as 61 in Figure 8. With the application of these fittings we may employ exceedingly efficient closing plugs 23 and 66 and the outer closure caps 28.

Thus only inexpensive units are applied to or moved with or are installed on the tank cars or tanks and the equipment necessary to carry out our method may be maintained at fixed loading and unloading points and under the complete control of skilled operators. Such equipment will normally be given careful service since the men using it are responsible for it and have it under their continuous control. This is in contrast to mechanisms attached to tanks, cars or the like which are subjected to abuse at various points and which get particularly careless treatment in view of the fact that such equipment is frequently leased and is not owned even by the employer of the operators using it. It will be clear that a large number of cars can be handled by employing a small number of loading and venting assemblies or units.

Stated broadly, our method involves loading tanks and if necessary thereafter unloading them while maintaining the contents closed to the atmosphere. In handling volatile liquids, and particularly inflammable liquids, the result is not merely an enormous saving but a great increase in safety. A further advantage is in the saving of time. As an example of the problem faced, during the loading and transit of gasoline, a considerable portion of the gasoline is driven into vapor so that when the tank car arrives at its destination, pressure has been built up in the tank. Prevailingly in such cases the cap 13 is removed from the vent 9, referring to the parts as shown in Figure 1, and the vapors are allowed to blow off to the atmosphere. Otherwise, it would be dangerous for the operator to remove the dome cover. Some domes are even provided with a safety cover which prevents their removal until the pressure has been vented off.

This venting off of the gases requires several hours. It further results in a considerable loss of gasoline which costs the shipper not only the price of the gasoline but the freight paid on the gasoline which is thus wasted. By wasting the vapor into the atmosphere, a hazard is created. A spark from a passing locomotive may ignite vapor and many lives have been lost from this cause. In hot weather, cases have been known where as much as 3,000 gallons of gasoline have been wasted from a 10,000 gallon load. It is seldom that less than 300 gallons per load is lost even in cold weather. This involves not only a money loss to the producer but a waste of a limited natural resource. The problem of preventing this cost and hazard has long been considered but heretofore has not been solved.

We will consider our method as applied to the complete loading and unloading cycle of a tank car, it being understood, however, that our method may be applied in part to loading alone, or to unloading alone, or to the loading of fixed tanks such as are employed in butane and propane systems. However, we will itemize the entire sequence of steps.

Assume that the operator starts with an empty but closed car. A certain amount of liquid and gas, especially gas, will remain in the car after a load of gasoline has been removed therefrom. The car, however, if handled in accordance with our method, will not have been allowed to exhaust to the atmosphere and this gas will remain in the tank with the closure plugs 23 and 66 in place and protected by the outer closure caps 28. The operator first removes the outer closure caps and then applies either the loading assembly alone or both the loading and vent assemblies. In handling gasoline, both would probably be used and the operator will therefore apply both assemblies. Figure 5 illustrates the loading assembly in position with the member 23 locked in relation to the fitting 18. Figure 8 illustrates the vent assembly in position with the member 74 locked in relation to the fitting 61.

The operator next unscrews the plugs 23 and 66. The order in which he removes them may make no difference but considering first the loading of it, the operator unscrews the plug 23 and withdraws it into the upward position in which it is shown in Figure 6. The valve 38 meanwhile is kept in closed position. This puts the interior of the member 33 in communication with the interior of the tank 1. The valve 41 is also closed. The operator can then open the valve 41 and can determine what the vapor condition is within the tank. This will enable him to determine what the preceding charge in the car was. This is important, for example where it may be undesirable to load gasoline into a car which has last previously been used in the shipment of some entirely different liquid. After having determined the vaporization in the car and having found it satisfactory, the operator then opens the valve 38, and can permit the liquid to flow in through the hose 51 from any suitable source of supply. The liquid then flows down the eduction pipe 11. It is delivered close to the bottom of the tank, which substantially eliminates boiling or release of volatiles. This is important for example in connection with gasoline, which is a complex and unstable mixture.

Where substances are being filled which do not need to be sampled or gauged, such as propane or butane, the loading assembly only may be used and it may not be necessary to employ the gauging or sampling assembly at all. However, with many substances and for example with gasoline, it is necessary simultaneously to employ both assemblies. The operator, therefore, before beginning to deliver the liquid through the hose 51, will withdraw the vent plug 66 above the valve 77 and will close the valve 77 in order to prevent escape of gas from the tank. He then vents the space above the valve 77 by employing the vent valve assembly 84, 85, 86. He can then remove the plug 81 together with the stem 90 and the closure plug 66 and will substitute the plug 100 with its associated tube 104.

After the plug 100 has been screw-threaded into place, the valve 82 being meanwhile closed, the operator can then open the valve 77 and slide the gauge tube downwardly into the tank. He can then open the valve 82 if he desires to draw off the gases as they form, or he can rely on the back pressure regulator 82a or may employ any other suitable control for maintaining a constant pressure and for permitting an exhaust or escape when a predetermined pressure is exceeded. He may then start the flow of the liquid inwardly along the hose 51. He can from time to time take samples through the tube 104. These samples can be drawn off through the assembly 113 as shown in Figure 10 and may be supplied directly to bottles, bombs or the like which may be screw-threaded into the threads 117 or otherwise attached. The samples may be taken at various levels and at various stages in the course of the filling operation.

The tube 104 in addition to functioning as a sample withdrawing device is effective to gauge the level of the liquid in the tank. When the operator wishes to know when to stop loading, he sets the bottom of the tube 104 at the desired upper level of the liquid. As long as the level of the liquid is below the bottom of the tube, only vapor or gas will be exhausted through the outlet 114. As soon as the liquid level reaches the bottom of the tube 104, then liquid will be exhausted through the passage 114 and the operator knows that the liquid in the tank has reached its desired level. He then cuts off further flow of liquid through the hose 51.

Thus the tank will have been filled without permitting any exhaustion of gases or vapors to the atmosphere with a consequent prevention of waste and hazard. The operator then vents the housing, and then removes the sampling and gauging assembly of Figure 9 and returns the member 81 into place, meanwhile closing the valve 77 to prevent any escape from the tank. When the member 81 is again tight and the valve 82 is closed, he opens the valve 77 and returns the plug 66 to initial position and screws it tightly in place. The vent 84 may then be employed to exhaust the pressure from the assembly and also to determine whether or not the plug 66 is in tight. Similarly, the plug 23 is returned to its initial position in which it is shown in Figure 5 and the valve 41 may be used to relieve pressure within the assembly and to indicate whether or not plug 23 is tight. Thereafter the operator can unscrew the wing nuts 39 and 73 and remove the assemblies and put the covers 28 back in place. The tank car is then firmly locking against escape of gas or vapor and can be stored in yards or taken to its destination for unloading.

When the car reaches the unloading zone, in practice it is necessary to gauge and sample the contents. Therefore, the operator at the other end applies the venting and gauging assemblies shown in Figure 8, removes the plug 66, closes the valve 77, removes the member 81, and reinstalls the gauge assemblies as shown in Figure 9 or Figure 10. He can then take his samples from various levels and can gauge the amount of liquid in the car. This gauging is effected by determining the level of the liquid in the car. As soon as the gauge tube 104 reaches the liquid, liquid is passed through the outlet 114. The operator then knows the precise level of liquid within the car by reading the calibration on the exterior of the tube 104 against the reading point X at the top of the member 102. By any suitable chart or key he can then determine the number of gallons of liquid in the tank. As a matter of convenience, as shown in Figure 2, we may illustrate on the exterior of the dome, so that the operator can read it, the distance, for example in inches, from the fixed reading point down to the top of the tank. This is merely an example as of course any one of a number of gauging systems may be employed whereby in response to the height of the tube the height of the liquid and the volume of liquid can quickly be determined.

Assume that the operator has made his samples and has made his determination of content and wishes to unload, the plug 23 is moved to the position in which it is shown in Figure 6 and the liquid may be drawn off through the passage 36 and the hose 51. It may be drawn off under suction or if desired pressure may be applied through the vent, for example by means of the hose 51a.

After the car has been emptied and there is no substantial liquid left in it, the vapors may if desired be exhausted through either the hose 51 or 51a and may be withdrawn to be burned as fuel or to be handled any other way. In any event, they are prevented from exhausting to the atmosphere and there is therefore no wastage and no hazard.

When the unloading job is completed, the operator has only to remove the loading and venting assemblies as above described, after the plugs 23 and 66 have been firmly positioned in place, and the final step is to put the caps or outside closures 28 in position on the car. Whatever vestigial liquid or vapor may remain in the car is thus prevented from escaping and the car is sealed tight until it is again loaded.

In charging tanks with liquids or with gases, and for example in charging propane or butane fixed systems, the unloading steps are omitted. Once the tank has been loaded, the user simply permits the gas to pass off to the point of combustion in a stove, heater or the like and when, by any suitable means, it is determined that the tank calls for recharging, the operator may apply his loading assembly as above described, fill the tank to a predetermined pressure, and then remove his loading assembly, leaving the tank sealed and having kept its interior at all times closed to the atmosphere.

Referring to the assemblies shown in Figures 12 to 14, inclusive, the method described in connection with the other figures may equally well be carried out with such structures. Assume that the operator wishes to load a car or tank and that the loading fitting, as shown in Figure 14, is in position with the valve 153 closed and the plug or cap 180 in place. He simply unscrews the plug 180, while leaving the valve 153 closed, and screws the passage member 157 into place. He sees that the vent valve 165 is closed. He may then connect the hose 163 to the valve housing 161 and to the source of fluid to be supplied to the tank. Then by opening the valve 153 he puts the interior of the passage 157 into communication with the tank and by opening the valve 162 he puts the passage into communication with the source of supply.

If the operator is loading a liquid which is delivered under pressure or which generates pressure or releases gases to build up pressure, he may at the same time have to employ the venting assembly shown in Figure 13. In such case, he removes the appropriate cover 180, positions the passage member 170 in place, and opens the valve 174 and the valve 153, thereby permitting the escape of gases from the tank to the hose 176. If desired, a pressure release valve 82a may be employed in connection with the hose 176, just as shown in Figure 2, whereby no gas will be permitted to escape unless and until a predetermined pressure is built up and that pressure, if desired, is maintained.

If the operator wishes to sample a liquid as it is being supplied, he can slide the gauge tube 104 down through the valve 153 and take a sample at any depth he wishes. If he wishes to gauge the liquid and determine when to stop delivering liquid through the hose 163, he positions the gauge tube 104 at the desired height and closes the valve 162 as soon as the gauge tube 104 begins to pass the liquid through its outlet 117. Whereas in Figure 13 we have not shown a pump, it will be understood that the pump as shown in Figure 9 may be applied to the structure of Figure 13 when the operator is handling a liquid which is not supplied under pressure.

The unloading method is carried on in much the same way as described in connection with the earlier figures. Where a tank car is shipped, when the car has been loaded the valve assemblies are removed and the closures 180 are put back in place, the valves 153 meanwhile being closed. At the unloading point, the valve fittings are again substituted for the closure plugs 180 and the operator gauges and samples by employing the gauge tube 104. The liquid can then be drawn off either by suction or by pressure.

The operator during both the loading and unloading operation can vent the space between the valves 153 and 162, or between the valves 153 and 174 prior to removing the passage members 157 or 170. This venting will also serve to determine whether or not the valves are tightly in closed position.

In reference to the structures as shown in Figures 2 and 15 and the variant valve assemblies shown in Figures 12 to 14, it will be understood that we may either carry off gases along the line 51a to a suitable point or zone of disposal, storage or the like, remote from the source of liquid being loaded, or we may return the gases to the liquid supply zone. For instance, in handling certain liquids such as propane, it may be desirable to connect the tank 1 with the propane supply tank through one or more loading lines 51 and a return gas line 51a, whereby the gases which are allowed or caused to escape from the tank 1 are returned to the propane tank from which the liquid initially is delivered along the line 51. We give propane as an example, but it will be understood that the same method may be employed in handling a variety of gases or liquids.

We claim:

1. The method of loading a tank with a liquid which includes the following steps; applying removable valve assemblies to the inlet and vent apertures of a tank while said inlet and vent apertures are closed; thereafter putting the interiors of the valve assemblies in communication with the interior of the tank; thereafter delivering a liquid to the interior of the tank through the inlet aperture and its associated valve assembly, while maintaining the interior of the valve assembly and the tank closed to the atmosphere; permitting the escape of gas through the vent aperture and its associated valve assembly during the loading operation, while maintaining the interior of the tank and said valve assembly closed to the atmosphere; terminating the liquid delivery when the liquid in the tank reaches the desired top level; closing the inlet and vent apertures while maintaining the interior of the valve assemblies closed to the atmosphere; and thereafter removing the valve assemblies.

2. A method which comprises securing a housing in sealed relation to an opening in a tank, while the closure of said opening is in normal position sealing said opening, effecting manipulation through said housing of said closure to open the same, placing the interior of said housing in communication with a source of fluid to be transferred, delivering said fluid through said housing and opening into said tank while maintaining the housing otherwise closed, thereafter effecting manipulation through said housing of said closure and thereby restoring the same to its original position sealing said opening, disconnecting said housing from said source of fluid and thereafter removing said housing from said opening.

3. A method which comprises securing a housing in sealed relation to an opening in a tank, while the closure of said opening is in normal closed position, effecting manipulation through said housing of said closure to open the same, placing the interior of said housing in communication with a source of fluid to be transferred, delivering said fluid through said housing and opening into said tank while maintaining the housing otherwise closed, thereafter effecting manipulation through said housing of said closure to close the same, disconnecting said housing from said source of fluid and thereafter venting the interior of said housing and removing said housing from said opening.

4. A method which comprises securing a housing in sealed relation to an opening in a tank, while the closure of said opening is in normal position sealing the latter, effecting manipulation through said housing of said closure to open the same, placing the interior of said housing in communication with a source of fluid to be transferred, delivering said fluid through said housing and opening into said tank while maintaining the housing otherwise closed, arranging for the escape of gas from the interior of the tank during the delivery, thereafter effecting manipulation through said housing of said closure and thereby restoring it to its original position, sealing said opening, disconnecting said housing from said source of fluid and thereafter removing said housing from said opening.

5. A method which comprises securing a pair of housings each in sealed relation to one of a pair of openings in a tank while the closures of said openings are in their closed position, effecting manipulation through said housings of said closures to open the same, placing the interior of one of said housings in communication with a source of fluid to be transferred, delivering fluid through said one housing and the associated opening into said tank while maintaining the interior of the housing through which delivery occurs closed to the atmosphere, arranging for the escape of gas through the other of said housings, terminating the delivery of fluid to said tank, thereafter effecting manipulation through said housings of said closures to close the same, disconnecting said one housing from said source of fluid and thereafter removing said housings from their respective openings.

6. A method which comprises securing a pair of housings each in sealed relation to one of a pair of openings in a tank while the closures of said openings are in their normal closed position, effecting manipulation through said housings of said closures to open the same, placing the interior of one of said housings in communication with a source of fluid to be transferred, delivering fluid through said one housing and its associated opening into said tank while maintaining the interior of the housing through which delivery occurs closed to the atmosphere, arranging for the escape of gas through the other of said housings, terminating the delivery of fluid to said tank, thereafter effecting manipulation through said housings of said closures to close the same, disconnecting said one housing from said source of fluid and thereafter venting said assemblies and removing said housings from their respective openings.

7. A method which comprises securing a pair of housings each in sealed relation to one of a pair of openings in a tank while the closures of said openings are in their normal closed position, effecting manipulation through said housings of said closures to open the same, placing the interior of one of said housings in communication with a source of fluid to be transferred, delivering fluid through said one housing and its associated opening into said tank while maintaining the interior of the housing through which delivery occurs closed to the atmosphere, arranging for the escape of gas through the other of said housings when the gas within the tank is at a predetermined pressure, terminating the delivery of fluid to said tank, thereafter effecting manipulation through said housings of said closures to close the same, disconnecting said one housing from said source of fluid and thereafter removing said housings from their respective openings.

8. A method which comprises securing a housing in sealed relation to a plurality of openings in a tank while the closures of said openings are in their normal position sealing said opening, effecting manipulation through said housings of said closures to open the same, placing the interior of said housings in communication with a source of fluid to be transferred, delivering fluid through one of said housings in its opening into said tank while maintaining the interior of the housing through which delivery occurs closed to the atmosphere, arranging for the escape of gas through the other of said housings, terminating the delivery of fluid to said tank, thereafter effecting manipulation through said housings of said closures and thereby restoring the same to their original position, each sealing its respective opening, disconnecting said housings from said source of fluid and thereafter removing said housings from their respective openings.

9. A method of unloading fluid from a tank which comprises securing a housing in sealed relation to an opening in said tank, while the closure of said opening is in normal position sealing said opening, effecting manipulation through said housing of said closure to open the same, placing the interior of said housing in communication with a suitable fluid receptacle, delivering said fluid through said housing and opening from said tank and into said receptacle while maintaining the housing otherwise closed, thereafter effecting manipulation through said housing of said closure and thereby restoring the same to its original position sealing said opening, disconnecting said housing from said fluid receptacle and thereafter removing said housing from said opening.

VIRGIL I. HOOPER.
LOUIS G. HOOPER.